United States Patent
Sikdar

(10) Patent No.: US 7,130,987 B2
(45) Date of Patent: Oct. 31, 2006

(54) RECONFIGURABLE SEMANTIC PROCESSOR

(75) Inventor: Somsubhra Sikdar, San Jose, CA (US)

(73) Assignee: Mistletoe Technologies, Inc., San Jose, CA (US)

( * ) Notice: Subject to any disclaimer, the term of this patent is extended or adjusted under 35 U.S.C. 154(b) by 628 days.

(21) Appl. No.: 10/351,030

(22) Filed: Jan. 24, 2003

(65) Prior Publication Data

US 2004/0148415 A1    Jul. 29, 2004

(51) Int. Cl.
*G06F 7/00* (2006.01)
(52) U.S. Cl. ...................................... 712/200
(58) Field of Classification Search ................ 712/200; 709/230, 236
See application file for complete search history.

(56) References Cited

U.S. PATENT DOCUMENTS

| | | | |
|---|---|---|---|
| 5,193,192 A | 3/1993 | Seberger ..................... | 717/143 |
| 5,487,147 A | 1/1996 | Brisson ........................ | 714/1 |
| 5,632,034 A * | 5/1997 | O'Farrell .................... | 717/140 |
| 5,781,729 A | 7/1998 | Baker et al. | |
| 5,793,954 A | 8/1998 | Baker et al. | |
| 5,805,808 A | 9/1998 | Hasani et al. .............. | 709/293 |
| 5,916,305 A | 6/1999 | Sikdar et al. .............. | 709/236 |
| 5,991,539 A | 11/1999 | Williams .................... | 717/143 |
| 6,000,041 A | 12/1999 | Baker et al. | |
| 6,034,963 A | 3/2000 | Minami et al. ............. | 370/401 |
| 6,085,029 A | 7/2000 | Kolawa et al. ............. | 714/38 |
| 6,122,757 A | 9/2000 | Kelley ......................... | 714/39 |
| 6,145,073 A | 11/2000 | Cismas ........................ | 712/25 |
| 6,208,649 B1 * | 3/2001 | Kloth .......................... | 370/392 |
| 6,266,700 B1 | 7/2001 | Baker et al. | |
| 6,330,659 B1 | 12/2001 | Poff et al. .................... | 712/34 |
| 6,341,130 B1 * | 1/2002 | Lakshman et al. .......... | 370/389 |
| 6,356,950 B1 | 3/2002 | Tillmann et al. ............ | 709/246 |
| 6,493,761 B1 | 12/2002 | Baker et al. | |
| 6,549,916 B1 | 4/2003 | Sedlar | |
| 6,763,499 B1 | 7/2004 | Friedman et al. | |
| 6,920,154 B1 * | 7/2005 | Achler ....................... | 370/477 |
| 6,952,666 B1 * | 10/2005 | Weise ........................... | 704/9 |
| 6,985,964 B1 | 1/2006 | Petersen et al. | |
| 2001/0056504 A1 | 12/2001 | Kuznetsov ................... | 710/65 |
| 2002/0078115 A1 | 6/2002 | Poff et al. .................... | 718/1 |
| 2002/0083331 A1 * | 6/2002 | Krumel ...................... | 713/200 |

(Continued)

OTHER PUBLICATIONS

*Can Programming be Liberated from the von Neumann Style48 A Functional Style and Its Algebra of Programs* (John Backus, Communications of the ACM, Aug. 1978, vol. 21 No. 8, pp. 613-641).

(Continued)

*Primary Examiner*—Eric Coleman
(74) *Attorney, Agent, or Firm*—Marger Johnson & McCollom, P.C.

(57) ABSTRACT

Data processors and methods for their configuration and use are disclosed. As opposed to traditional von Neumann microprocessors, the disclosed processors are semantic processors—they parse an input stream and direct one or more semantic execution engines to execute code segments, depending on what is being parsed. For defined-structure input streams such as packet data streams, these semantic processors can be both economical and fast as compared to a von Neumann system. Several optional components can augment device operation. For instance, a machine context data interface relieves the semantic execution engines from managing physical memory, allows the orderly access to memory by multiple engines, and implements common access operations. Further, a simple von Neumann exception-processing unit can be attached to a semantic execution engine to execute more complicated, but infrequent or non-time-critical operations.

49 Claims, 8 Drawing Sheets

U.S. PATENT DOCUMENTS

| | | | |
|---|---|---|---|
| 2002/0116527 A1* | 8/2002 | Chen et al. | 709/245 |
| 2003/0060927 A1 | 3/2003 | Gerbi et al. | 700/245 |
| 2003/0165160 A1 | 9/2003 | Minami et al. | 370/241 |
| 2004/0062267 A1 | 4/2004 | Minami et al. | 370/463 |
| 2004/0081202 A1 | 4/2004 | Minami et al. | 370/463 |
| 2005/0165966 A1 | 7/2005 | Gai et al. | |

OTHER PUBLICATIONS

*Compilers Principles, Techniques, and Tools* (Alfred V. Aho, Ravi Sethi, Jeffrey D. Ullman, Mar. 1988, pp. 186-192, 216-257).

* cited by examiner

RECONFIGURABLE SEMANTIC PROCESSOR

FIELD OF THE INVENTION

This invention relates generally to digital processors and processing, and more specifically to digital semantic processors for data stream processing.

BACKGROUND OF THE INVENTION

Traditional programmable computers use a von Neumann, or VN, architecture. The VN architecture, in its simplest form, comprises a central processing unit (CPU) and attached memory, usually with some form of input/output to allow useful operations. For example, FIG. 1 shows a computer 20 comprising a CPU 30, a memory controller 40, memory 50, and input/output (I/O) devices 60. CPU 30 sends data requests to memory controller 40 over address/control bus 42; the data itself passes over a data bus 44. Memory controller 40 communicates with memory 50 and I/O devices 60 to perform data reads and writes as requested by CPU 30 (or possibly by the I/O devices). Although not shown, the capability exists for various devices to "interrupt" the CPU and cause it to switch tasks.

In a VN machine, memory 50 stores both program instructions and data. CPU 30 fetches program instructions from the memory and executes the commands contained therein—typical instructions instruct the CPU to load data from memory to a register, write data to memory from a register, perform an arithmetic or logical operation using data in its onboard registers, or branch to a different instruction and continue execution. As can be appreciated, CPU 30 spends a great deal of time fetching instructions, fetching data, or writing data over data bus 44. Although elaborate (and usually costly) schemes can be implemented to cache data and instructions that might be useful, implement pipelining, and decrease average memory cycle time, data bus 44 is ultimately a bottleneck on processor performance.

The VN architecture is attractive, as compared to gate logic, because it can be made "general-purpose" and can be reconfigured relatively quickly; by merely loading a new set of program instructions, the function of a VN machine can be altered to perform even very complex functions, given enough time. The tradeoffs for the flexibility of the VN architecture are complexity and inefficiency. Thus the ability to do almost anything comes at the cost of being able to do a few simple things efficiently.

SUMMARY OF THE INVENTION

Many digital devices either in service or on the near horizon fall into the general category of packet processors. In other words, these devices communicate with another device or devices using packets, e.g., over a cable, fiber, or wireless networked or point-to-point connection, a backplane, etc. In many such devices, what is done with the data received is straightforward, but the packet protocol and packet processing are too complex to warrant the design of special-purpose hardware. Instead, such devices use a VN machine to implement the protocols.

It is recognized herein that a different and attractive approach exists for packet processors, an approach that can be described more generally as a reconfigurable semantic processor (RSP). Such a device is preferably reconfigurable like a VN machine, as its processing depends on its "programming"—although as will be seen this "programming" is unlike conventional machine code used by a VN machine. Whereas a VN machine always executes a set of machine instructions that check for various data conditions sequentially, the RSP responds directly to the semantics of an input stream. In other words, the "code" that the RSP executes is selected by its input. Thus for packet input, with a defined grammar, the RSP is ideally suited to fast and efficient packet processing.

Some embodiments described herein use a table-driven predictive parser to drive direct execution of the protocols of a network grammar, e.g., an LL (Left-to-right parsing by identifying the Left-most production) parser. Other parsing techniques, e.g., recursive descent, LR (Left-to-right parsing by identifying the Right-most production), and LALR (Look Ahead LR) may also be used in embodiments of the invention. In each case, the parser responds to its input by launching microinstruction code segments on a simple execution unit. When the tables are placed in rewritable storage, the RSP can be easily reconfigured, and thus a single RSP design can be useful in a variety of applications. In many applications, the entire RSP, including the tables necessary for its operation, can be implemented on a single, low-cost, low-power integrated circuit.

A number of optional features can increase the usefulness of such a device. A bank of execution units can be used to execute different tasks, allowing parallel processing. An exception unit, which can be essentially a small VN machine, can be connected and used to perform tasks that are, e.g., complex but infrequent or without severe time pressure. And machine-context memory interfaces can be made available to the execution units, so that the execution units do not have to understand the underlying format of the memory units—thus greatly simplifying the code executed by the execution units.

BRIEF DESCRIPTION OF THE DRAWING

The invention may be best understood by reading the disclosure with reference to the drawing, wherein.

DETAILED DESCRIPTION OF THE PREFERRED EMBODIMENTS

The inventor of the present application is a co-inventor on a previous patent entitled "Pattern Recognition in Data Communications Using Predictive Parsers", U.S. Pat. No. 5,916,305, issued Jun. 29, 1999. Although overall the device described in the '305 patent is quite different from the present invention, it is instructive as a general introduction to the use of a rudimentary predictive parser in conjunction with a network protocol, as a pattern matcher.

Figure 1:
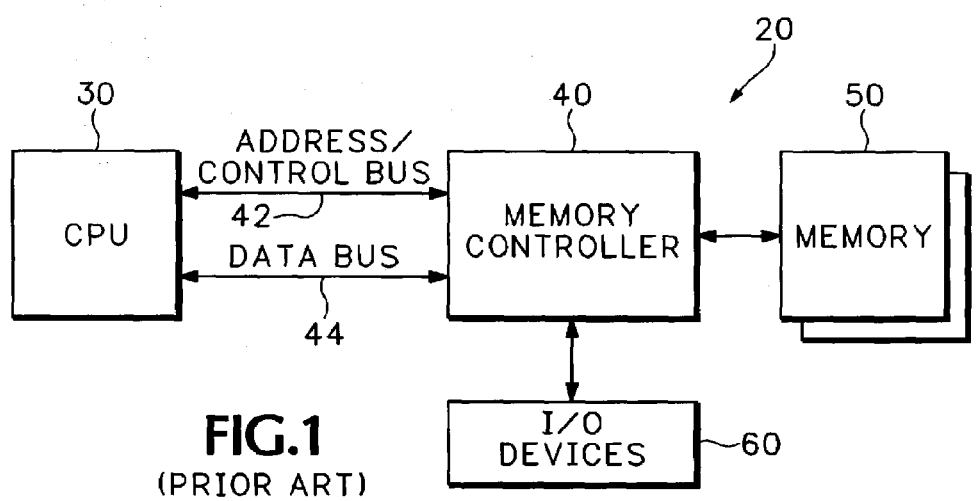
FIG. 1 contains a block diagram for a typical von Neumann machine.
Figure 2:
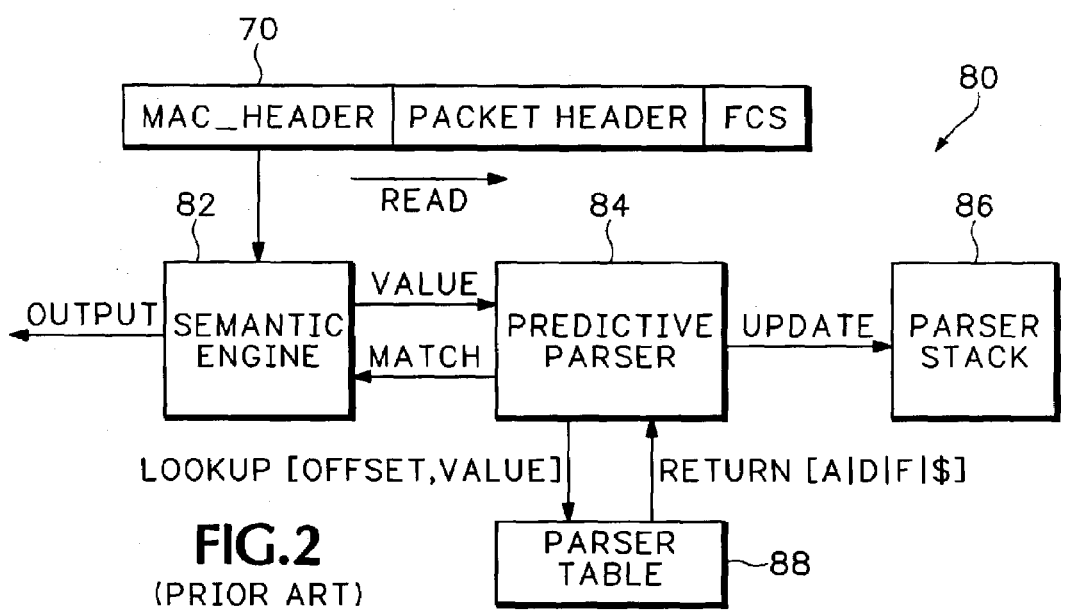
FIG. 2 contains a block diagram for a predictive parser pattern recognizer previously patented by the inventor of the present invention.

FIG. 2 shows a block diagram of a device 80 as described in the '305 patent. A semantic engine 82 reads a packet 70, and passes the packet data octets as values to predictive parser 84. Predictive parser 84 examines each value (octet) that is passed to it. First, parser 84 performs a table lookup using the value and the offset of that value's location from the beginning of packet 70 as an index into parser table 88. Parser table 88 stores, for each combination of value and offset, one of four possible values: 'A', meaning accept the value at that offset; 'D', meaning that the combination of value and offset is a "don't care"; 'F', meaning failure as the value at the offset is not part of the pattern to be recognized; and '$', for an end symbol.

Parser stack 86 is not a true "stack" in the normal meaning of the word (or as applied to the invention embodiments to be described shortly)—it merely keeps a state variable for each "filter" that parser 84 is trying to match. Each state variable is initialized to an entry state. As table entries are subsequently returned for each value and offset, the stack updates each stack variable. For instance, if an 'A' is returned for a stack variable, that stack variable moves from the entry state to a partial match state. If a 'F' is returned, that stack variable moves from either the entry state or the partial match state to a failure state. If a 'D' is returned, that stack variable maintains its current state. And if a '$' is returned while the state variable is in the entry state or the partial match state, the state variable transitions to the match state.

Once semantic engine 82 has passed all packet values to predictive parser 84, parser 84 returns a match value based on the parser stack states. Semantic engine 82 then takes some output action depending on the success or failure of the match. It should be noted that the parser does not control or coordinate the device function, but instead merely acts as an ancillary pattern matcher to a larger system. Each possible pattern to be distinguished requires a new column in the parser table, such that in a hardware implementation device 80 can match only a limited number of input patterns. And a parser table row is required for each input octet position, even if that input octet position cannot affect the match outcome.

Figure 3:
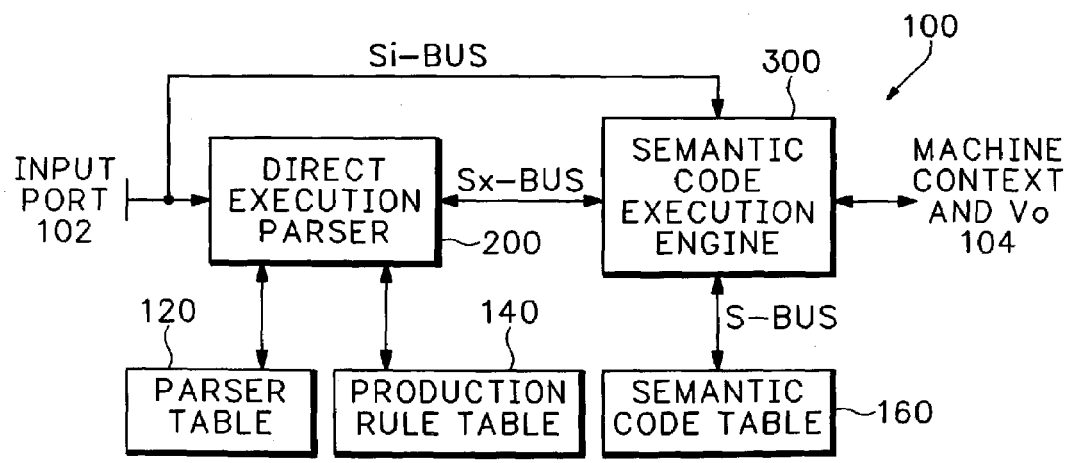
FIG. 3 illustrates, in block form, a semantic processor according to an embodiment of the invention.

The embodiments described herein take a decidedly different approach to data processing. FIG. 3 shows a semantic processor 100 according to an embodiment of the invention. Rather than merely matching specific input patterns to specific stored patterns, semantic processor 100 contains a direct execution parser (DXP) 200 that controls the processing of input packets. As DXP 200 parses data received at the input port 102, it expands and executes actual grammar productions in response to the input, and instructs semantic code execution engine (SEE) 300 to process segments of the input, or perform other operations, as the grammar executes.

This structure, with a sophisticated grammar parser that assigns machine context tasks to an execution engine, as the data requires, is both flexible and powerful. In preferred embodiments, the semantic processor is reconfigurable, and thus has the appeal of a VN machine without the high overhead. Because the semantic processor only responds to the input it is given, it can operate efficiently with a smaller instruction set than a VN machine. The instruction set also benefits because the semantic processor allows processing in a machine context.

Semantic processor 100 uses at least three tables. Code segments for SEE 300 are stored in semantic code table 160. Complex grammatical production rules are stored in a production rule table 140. Codes for retrieving those production rules are stored in a parser table 120. The codes in parser table 120 also allow DXP 200 to detect whether, for a given production rule, a code segment from semantic code table 160 should be loaded and executed by SEE 300.

Some embodiments of the present invention contain many more elements than those shown in FIG. 3, but these essential elements appear in every system or software embodiment. A description of each block in FIG. 3 will thus be given before more complex embodiments are addressed.

Figure 4:
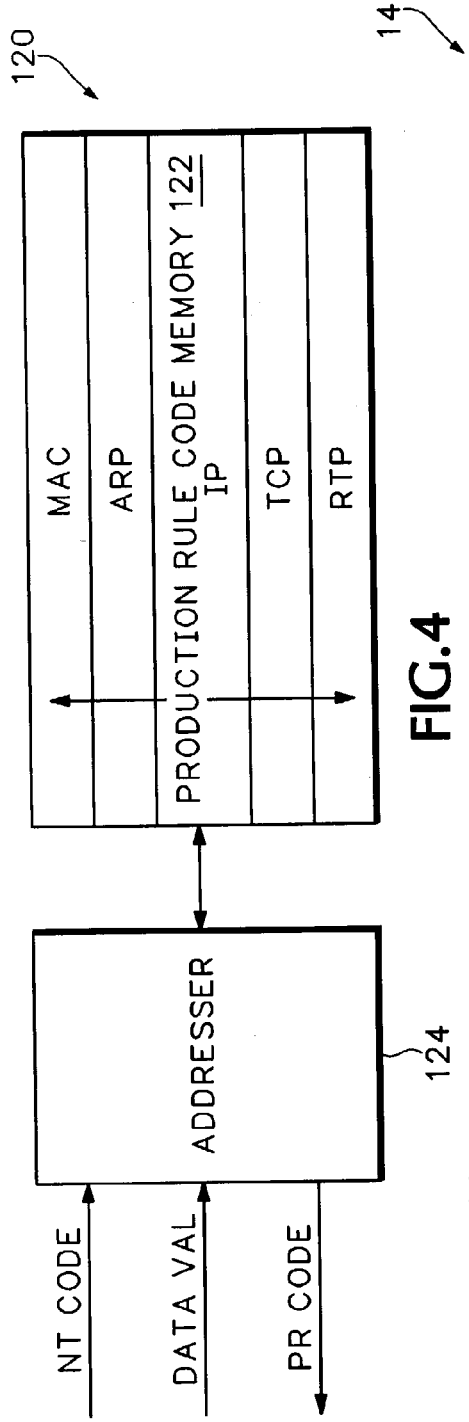
FIG. 4 shows one possible parser table construct useful with embodiments of the invention.

FIG. 4 shows a general block diagram for a parser table 120. A production rule code memory 122 stores table values, e.g., in a row-column format. The rows of the table are indexed by a non-terminal code. The columns of the table are indexed by an input data value.

Practically, codes for many different grammars can exist at the same time in production rule code memory 122. For instance, as shown, one set of codes can pertain to MAC (Media Access Control) packet header format parsing, and other sets of codes can pertain to Address Resolution Protocol (ARP) packet processing, Internet Protocol (IP) packet processing, Transmission Control Protocol (TCP) packet processing, Real-time Transport Protocol (RTP) packet processing, etc. Non-terminal codes need not be assigned in any particular order in production rule code memory 122, nor in blocks pertaining to a particular protocol as shown.

Figure 11:
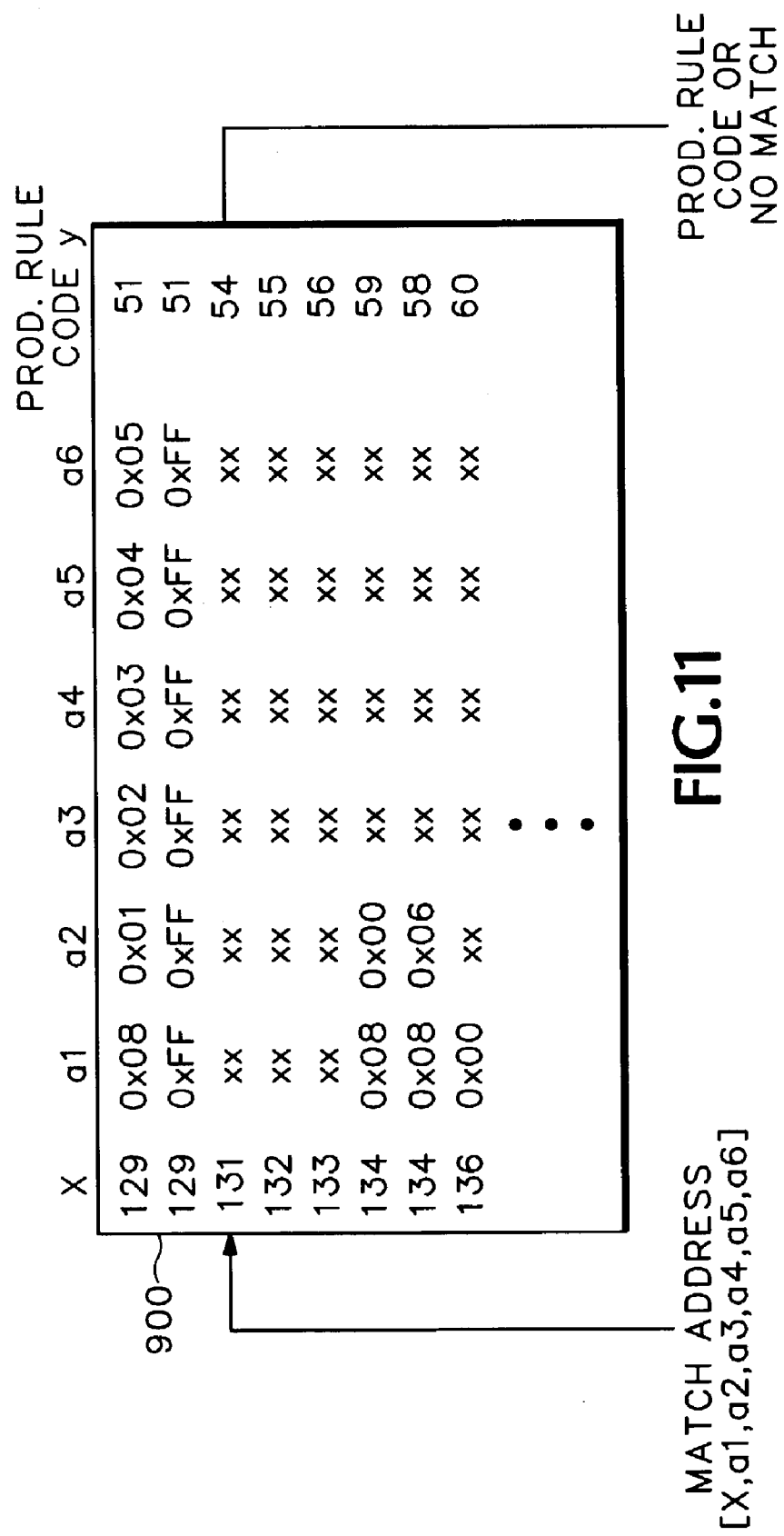
FIG. 11 illustrates an alternate parser table implementation using a Content-Addressable Memory (CAM).

Addresser 124 receives non-terminal (NT) codes and data values from DXP 200. Addresser 124 translates [NT code, data value] pairs into a physical location in production rule code memory 122, retrieves the production rule (PR) code stored at that location, and returns the PR code to the DXP. Although conceptually it is often useful to view the structure of production rule code memory 122 as a matrix with one PR code stored for each unique combination of NT code and data value, the present invention is not so limited. Different types of memory and memory organization may be appropriate for different applications (one of which is illustrated in FIG. 11).

Parser table 120 can be located on or off-chip, when DXP 200 and SEE 300 are integrated together in a circuit. For instance, a static RAM located on-chip can serve as parser table 120. Alternately, off-chip DRAM storage can store parser table 120, with addresser 124 serving as or communicating with a memory controller for the DRAM. In other embodiments, the parser table can be located in off-chip memory, with an on-chip cache capable of holding a section of the parser table. Addresser 124 may not be necessary in some implementations, but when used can be part of parser 200, part of parser table 120, or an intermediate functional block. Note that it is possible to implement a look-ahead capability for parser table 120, by giving addresser 124 visibility into the next input value on the input stream and the next value on the DXP's parser stack.

Figure 5:
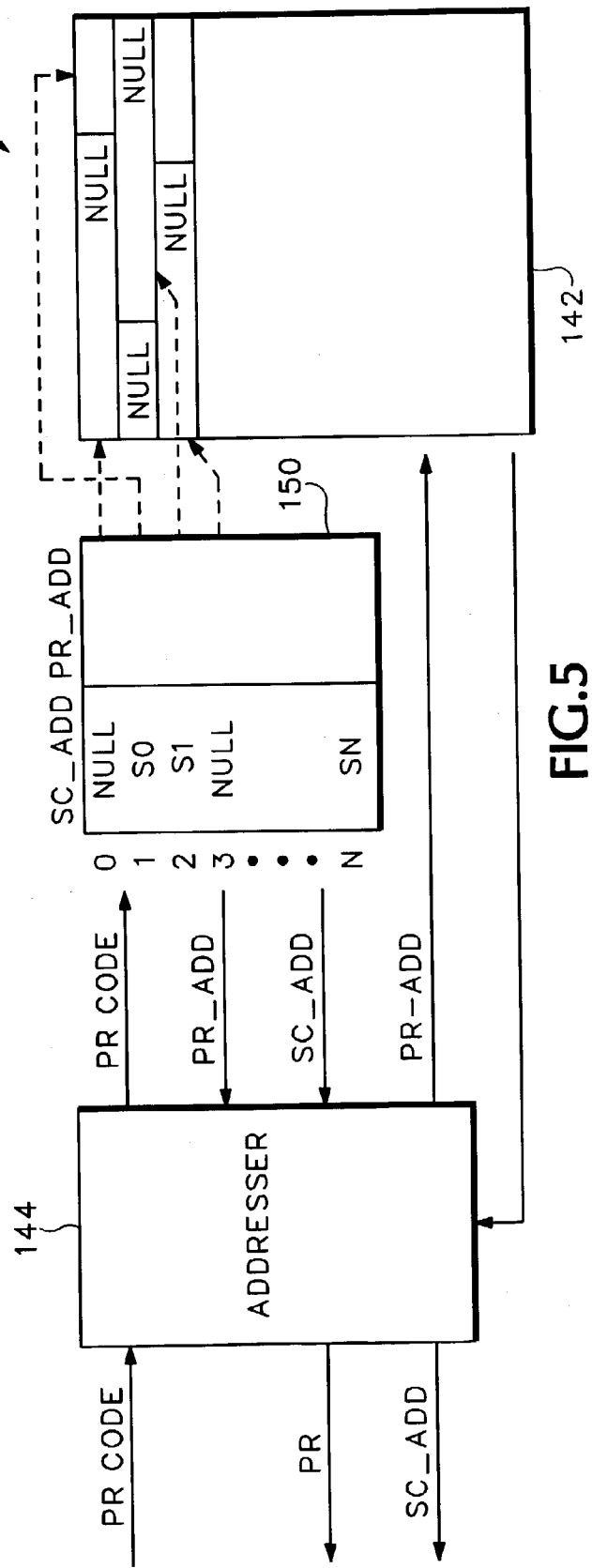
FIG. 5 shows one possible production rule table organization useful with embodiments of the invention.

FIG. 5 illustrates one possible implementation for production rule table 140. Production rule memory 142 stores the actual production rule sequences of terminal and non-terminal symbols, e.g., as null-terminated chains of consecutive memory addresses. An addresser 144 receives PR codes, either from DXP 200 or directly from parser table 120.

As production rules can have various lengths, it is preferable to take an approach that allows easy indexing into memory 142. In one approach, the PR code could be arithmetically manipulated to determine a production rule's physical memory starting address (this would be possible, for instance, if the production rules were sorted by expanded length, and then PR codes were assigned according to a rule's sorted position). The PR code could also be the actual PR starting address, although in some applications this may make the PR codes unnecessarily lengthy. In the approach shown in FIG. 5, a pointer table 150 is populated with a PR starting address for each PR code. Addresser 144 retrieves a production rule by querying pointer table 150 using the PR code as an address. Pointer table 150 returns a PR starting address PR_ADD. Addresser 144 then retrieves PR data from production rule memory 142 using this starting address. Addresser 144 increments the starting address and continues to retrieve PR data until a NULL character is detected.

FIG. 5 shows a second column in table 150, which is used to store a semantic code (SC) starting address. When DXP 200 queries addresser 144 with a PR code, the addresser not only returns the corresponding production rule, but also the SC starting address for a SEE task to be performed. Where no SEE task is needed for a given production rule, the SC starting address is set to a NULL address.

Figure 6:
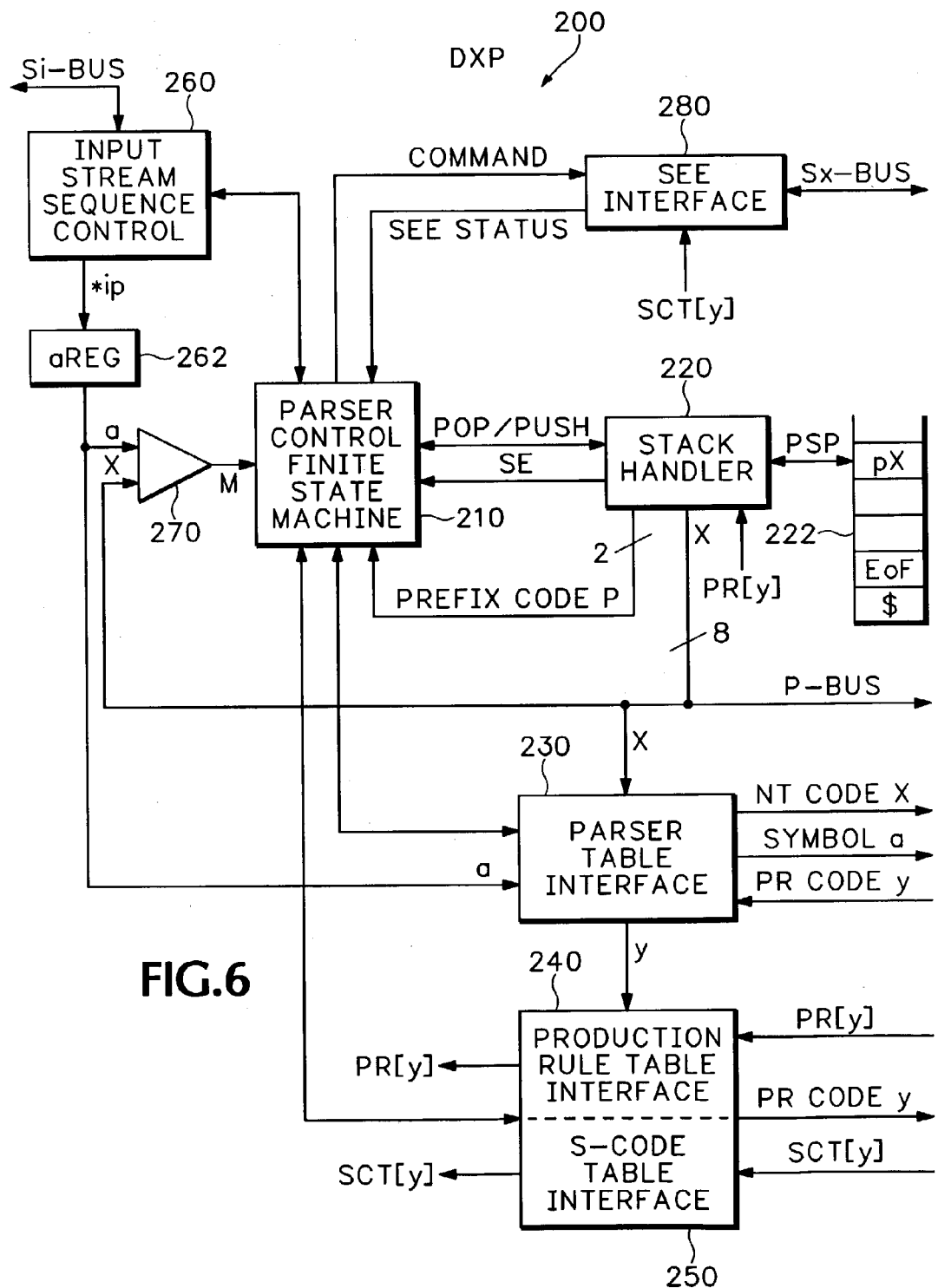
FIG. 6 illustrates, in block form, one implementation for a direct execution parser (DXP) useful with embodiments of the present invention.

FIG. 6 shows one possible block implementation for DXP 200. Parser control finite state machine (FSM) 210 controls and sequences overall DXP operation, based on inputs from the other logical blocks in FIG. 6. Stack handler 220 and stack 222 store and sequence the production rules executed by DXP 200. Parser table interface 230 allows DXP 200 to retrieve PR codes from an attached parser table. Production rule table interface 240 allows DXP 200 to retrieve production rules from an attached production rule table. And semcode table interface 250 allows DXP 200 to identify the memory location of semantic code segments associated with production rules (in the illustrated embodiment, interfaces 240 and 250 are partially combined).

Input stream sequence control 260 and register 262 retrieve input data symbols from the Si-Bus. Comparator 270 compares input symbols with symbols from parser stack 222. Finally, SEE interface 280 is used to dispatch tasks to one or more SEEs communicating with DXP 200 on the Sx-Bus.

The basic operation of the blocks in FIG. 6 will now be described with reference to the flowchart in FIG. 7. At the beginning of each parsing cycle (flowchart block 400), stack handler 220 retrieves a production symbol pX pointed to by its top-of-stack pointer psp. The production symbol pX is split into two constituent parts, a prefix p and a symbol X. Prefix p codes the type of the symbol X, e.g., according to the following mapping for a two-bit prefix:

TABLE 1

| Prefix value p | Type for symbol X |
|---|---|
| 00 | Invalid symbol |
| 01 | Non-terminal symbol |
| 10 | Terminal symbol |
| 11 | Don't care terminal symbol; matches any input symbol |

Note that instead of a prefix for a "don't care" terminal symbol, the prefix can indicate a masked terminal symbol. A masked terminal symbol allows the specification of a bit mask for the input symbol, i.e., some (or all) bits of the terminal symbol are "don't care" bits. The masked terminal symbol construct can be useful, e.g., for parsing packet flag fields such as occur in many network protocols.

Input stream sequence control 260 also loads the current input stream value pointed to by input pointer ip into aReg register 262. This step may not be necessary if the previous parsing cycle did not advance input pointer ip.

When parser control FSM 210 receives the new prefix code p from stack handler 220, it determines (flowchart block 402) which of three possible logic paths to take for this parsing cycle. If the prefix code indicates that X is a terminal symbol, path 410 is taken. If the prefix code indicates that X will match any input symbol, path 420 is taken. And if the prefix code indicates that X is a non-terminal symbol, path 430 is taken. The processing associated with each path will be explained in turn.

When path 410 is taken, parser control FSM 200 makes another path branch, based on the symbol match signal M supplied by comparator 270. Comparator 270 compares input symbol a to stack symbol X—if the two are identical, signal M is asserted. If masked terminal symbols are allowed and a masked terminal symbol is supplied, comparator 270 applies the mask such that signal M depends only on the unmasked stack symbol bits.

When a particular input symbol is expected and not found, parser control FSM 210 enters an error recovery mode at block 414. Generally, error recovery will flush the remainder of the packet from the input (e.g., by matching the input with an end of frame (EOF) symbol until a match is detected), and popping the remaining symbols off the stack. A semCode segment may also be dispatched to a SEE to clean up any machine state data related to the errant packet. These and other actions may depend on the particular grammar being parsed at the time of the error.

Assuming that a match between a and X is found at block 412, further processing joins the processing path 420.

Figure 7:
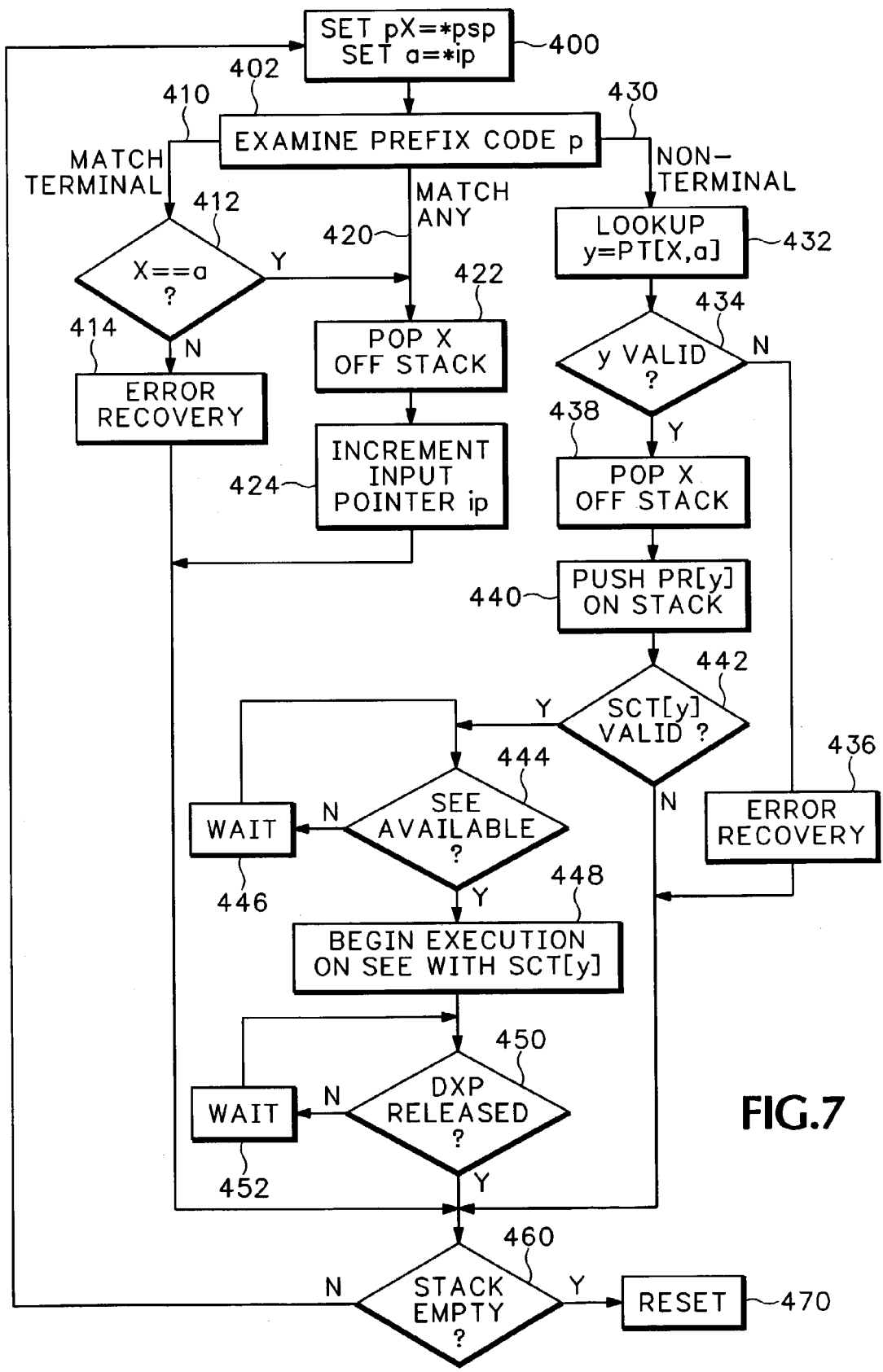
FIG. 7 contains a flowchart for the operation of the DXP shown in FIG. 6.

Processing path 420 accomplishes two tasks, shown as blocks 422 and 424 in FIG. 7. First, parser control FSM 210 signals stack handler 220 to "pop" the current value of X off of stack 222, e.g., by decrementing the stack pointer psp. Second, parser control FSM 210 signals input stream sequence control 260 to increment the input pointer ip to the next symbol in the input stream.

Processing path 430 processes non-terminal symbols appearing on stack 222. When a non-terminal symbol X reaches the top of the stack, processing blocks 432, 434, 438, and 440 expand the non-terminal symbol into its corresponding production rule. Parser control FSM 210 first signals parser table interface 230 to return a production rule code y=PT[X,a]. If y is invalid, parser control FSM 210 performs error recovery (block 436), e.g., as described above.

Assuming that PR code y is valid, parser control FSM 210 replaces X on stack 222 with its expanded production rule. Parser control FSM signals production rule table (PRT) interface 240 and SemCode table (SCT) interface 250 to perform lookups using PR code y. Parser control FSM 210 also signals stack handler 220 to pop the current value of X off of stack 222. When PRT interface 240 returns production rule PR[y], parser control FSM 210 signals stack handler 220 to push PR[y] onto stack 222. As each expanded production rule has a corresponding length, this length must be accounted for in the push, i.e. some expansions may require multiple symbol transfers from the production rule table (the path width from the table to the stack handler may, of course, be more than one symbol wide).

Meanwhile, SCT interface 250 has returned a corresponding SemCode address code SCT[y] for production rule PR[y]. The address code SCT[y] may contain an actual physical address for the first SemCode microinstruction corresponding to PR code y, or some abstraction that allows a SEE to load that microinstruction. The address code SCT[y] may contain other information as well, such as an indication of which SEE (in a multiple-SEE system) should receive the code segment.

When commanded by parser control FSM 210, SEE interface 280 examines SCT[y] and determines whether a code segment needs to be dispatched to a SEE. As shown by decision block 442 in FIG. 7, no microinstruction execution is necessary if SCT[y] is not "valid", i.e., a NULL value is represented. Otherwise, SEE interface 280 determines (decision block 444) whether a SEE is currently available. SEE interface 280 examines a semaphore register (not shown) to determine SEE availability. If a particular SEE is indicated by SCT[y], SEE interface 280 examines the semaphore for that SEE. If the semaphore indicates that the requested SEE is busy, SEE interface 280 enters wait state 446 until the semaphore clears. If any SEE may execute the SemCode segment, SEE interface 280 can simply select one with a clear semaphore.

When the semaphore is clear for the selected SEE, SEE interface 280 captures the SX-bus and transmits SCTL[y] to the selected SEE. The selected SEE sets its semaphore to indicate that it has received the request.

When parser control FSM 210 first commands SEE interface 280 to dispatch SCT[y], SEE interface 280 deasserts the SEE status line to suspend further parsing, thereby preventing parser control FSM 210 from exiting the current parsing cycle until SCT[y] is dispatched (the stack push of the expanded production rule PR[y] can continue in parallel while the SEE status line is deasserted). Whether or not DXP 200 continues to suspend parsing once SCT[y] has been transferred to the selected SEE can be dependent on SCT[y]. For instance, SCT[y] can also code how long the corresponding SemCode segment should block further processing by parser control FSM 210. In one embodiment, the DXU can be released: as soon as SCT[y] is dispatched; as soon as the SEE sets its semaphore; a programmable number of clock cycles after the SEE sets its semaphore; or not until the SEE sets and clears its semaphore. Alternately, the SEE can have different semaphore states corresponding to these different possibilities.

At the end of each parser cycle (decision block 460 in FIG. 7), stack handler 220 will assert stack empty signal SE to parser control FSM 210 if the stack is empty. Upon the assertion of the SE signal, parser control FSM 210 resets its states to wait for the beginning of the next input packet. As long as the stack is not empty, however, the parser control FSM returns to block 400 and begins a new parsing cycle.

Figure 8:
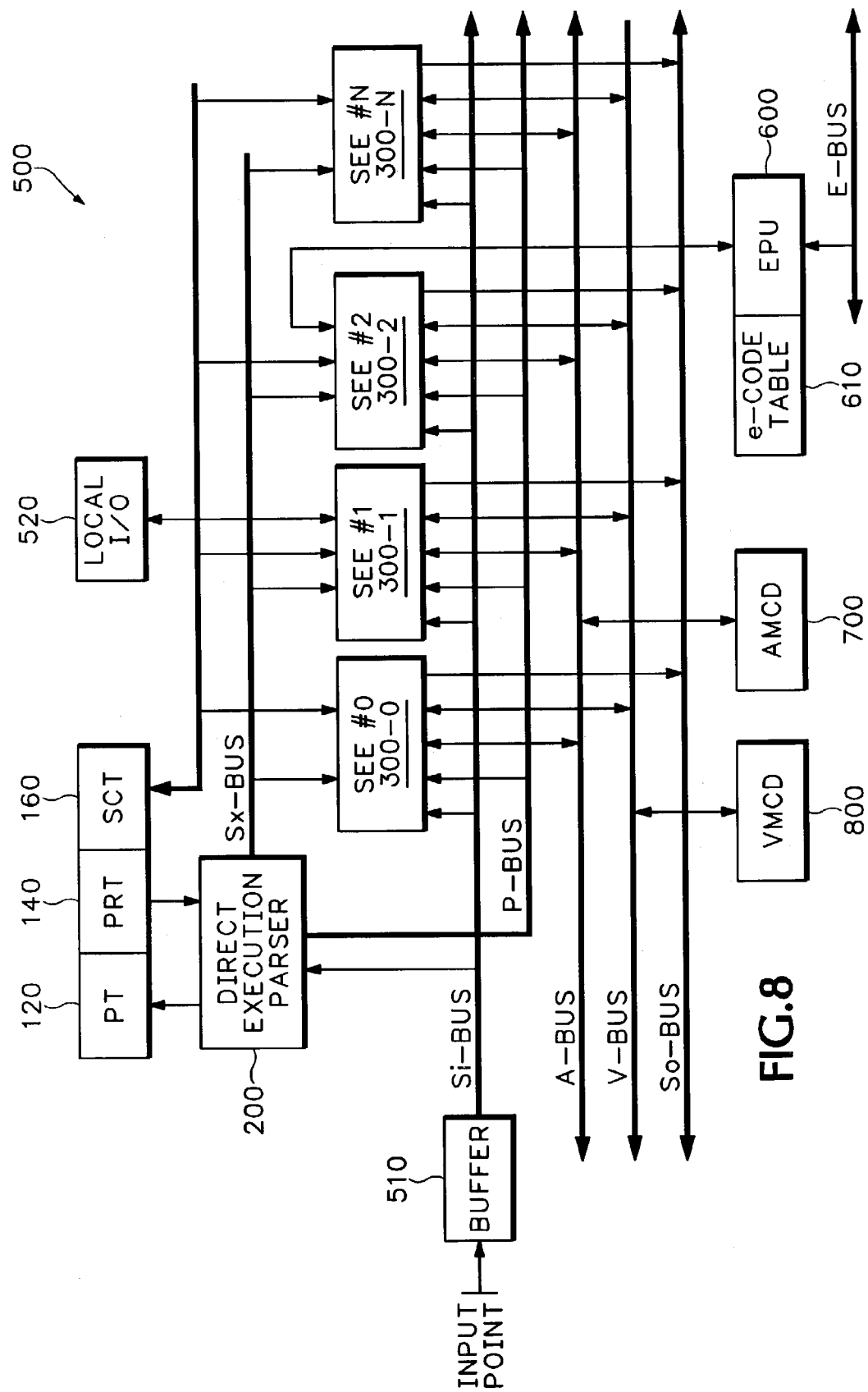
FIG. 8 shows a block diagram for a reconfigurable semantic processor according to an embodiment of the invention.

FIG. 8 shows a second RSP embodiment 500 with expanded capability. Instead of the single SEE 300 shown in FIG. 3, RSP 500 incorporates N+1 SEES 300-0 to 300-N. RSP 500 also contains several other significant additions: an exception processing unit (EPU) 600, an array machine-context data memory (AMCD) 700, and a variable machine-context data memory (VMCD) 800. The function of each block in FIG. 8 will now be explained in context.

Figure 9:
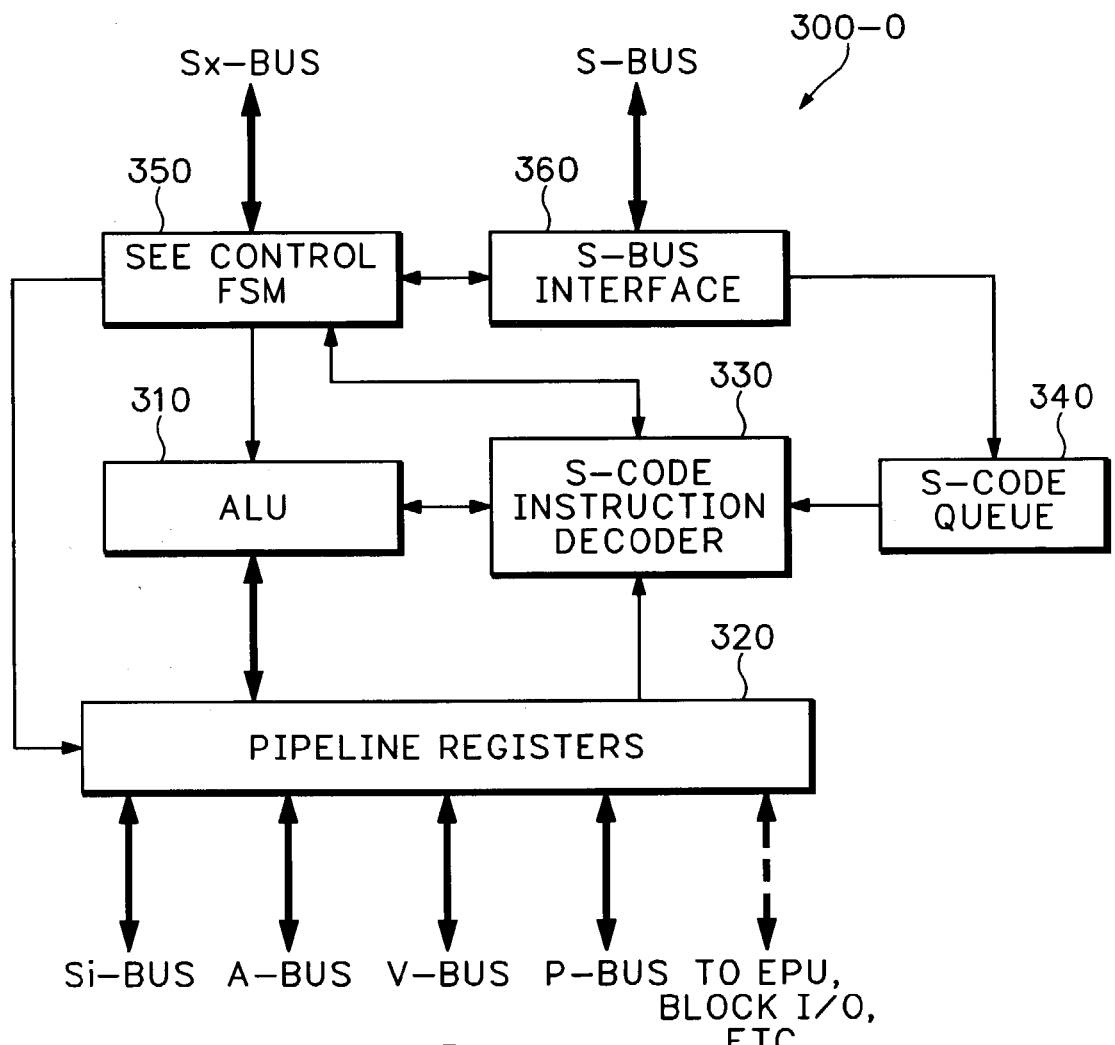
FIG. 9 shows the block organization of a semantic code execution engine useful with embodiments of the invention.

FIG. 9 illustrates the basic functional blocks of SEE 300-0. At the heart of SEE 300-0 is an arithmetic logic unit (ALU) 310, a set of pipeline registers 320, and a semCode (or s-code) instruction decoder 330. An s-code queue 340 stores microinstructions to be executed by the SEE. The microinstructions themselves are stored in semCode table 160 and received by the SEE S-bus interface 360. SEE control finite state machine (FSM) 350 coordinates the operation of the SEE blocks shown.

SEE 300-0 sits idle until it receives an execution request (from DXP 200) on the Sx-bus. SEE control FSM 350 examines traffic on the Sx-bus, waiting for a request directed to SEE 300-0 (for instance, up to 16 SEEs can be addressed with four Sx-bus address lines, each SEE having a unique address). When a request is directed to SEE 300-0, the request contains, e.g., a starting SemCode address. SEE control FSM 350 responds to the request by: setting its semaphore to acknowledge that it is now busy; and instructing S-bus interface 360 to drive a request on the S-bus to retrieve the microinstruction code segment beginning with the received starting SemCode address.

S-bus interface 360 is tasked with placing S-code instructions in queue 340 before s-code instruction decoder 330 needs them. S-bus interface does have to contend with other SEE S-bus interfaces for access to the S-bus, therefore it may be beneficial to download multiple sequential instructions at a time in a burst. S-bus interface 360 maintains an s-code address counter (not shown) and continues to download instructions sequentially unless directed otherwise by SEE control FSM 350.

S-code microinstruction decoder 330 executes the code segment requested by the DXP on ALU 310 and pipeline registers 320. Although preferably a branching capability exists within instruction decoder 330, many code segments will require little or no branching due the overall structure of the RSP.

ALU 310 can be conventional, e.g., having the capability to perform addition, comparison, shifting, etc., using its own register values and/or values from pipeline register 320.

Pipeline registers 320 allow machine-context access to data. As opposed to a standard CPU, the preferred SEE embodiments have no notion of the physical data storage structure used for the data that they operate on. Instead, accesses to data take a machine-context transactional form. Variable (e.g., scalar) data is accessed on the V-bus; array data is accessed on the A-bus; and input stream data is accessed on the Si-bus. For instance, to read a scalar data element of length m octets located at a given location offset within a data context ct, the instruction decoder 330 prompts the V-bus interface to issue a bus request {read, ct, offset, m}. The context met refers to the master context of the RSP; other sub-contexts will usually be created and destroyed as the RSP processes input data, such as a sub-context for a current TCP packet or active session.

Once a pipeline register has been issued a command, it handles the data transfer process. If multiple bus transfers are required to read or write m octets, the pipeline register tracks the transaction to completion. As an example, a six-octet field can be transferred from the stream input to a machine-context variable using two microinstructions: a first instruction reads six octets from the Si-bus to a pipeline register; a second instruction then writes the six octets from the register to the machine-context variable across the V-bus. The register interfaces perform however many bus data cycles are required to effect the transfer.

VMCD 800 serves the requests initiated on the V-bus. VMCD 800 has the capability to translate machine-context variable data requests to physical memory transactions. Thus VMCD 800 preferably maintains a translation table referencing machine context identifiers to physical starting addresses, contains a mechanism for allocating and deallocating contexts, allows contexts to be locked by a given SEE, and ensures that requested transactions do not fall outside of the requested context's boundaries. The actual storage mechanism employed can vary based on application: the memory could be completely internal, completely external, a mix of the two, a cache with a large external memory, etc. An external memory can be shared with external memory for other memory sections, such as the AMCD, e-code table, input buffer, parser table, production rule table, and semCode table, in a given implementation.

The A-bus interface and AMCD 700 operate similarly, but with an array machine context organization. Preferably, different types of arrays and tables can be allocated, resized, deallocated, written to, read from, searched, and possibly even hashed or sorted using simple bus requests. The actual underlying physical memory can differ for different types of arrays and tables, including for example fast onboard RAM, external RAM or ROM, content-addressable memory, etc.

Returning to the description of SEE 300-0 and its pipeline registers, each SEE can access input data from buffer 510 across the Si-bus. And each SEE has access to the P-bus and the current symbol on top of the parser stack—this can be useful, e.g., where the same s-code is used with multiple production rules, but its outcome depends on the production rule that initiated it. Finally, the pipeline registers of some SEEs can be specialized. For instance, SEE 300-1 in FIG. 8 communicates with local I/O block 520 to provide a data path to/from, e.g., local USB or serial ATA devices connected to local I/O block 520. And SEE 300-2 in FIG. 8 communicates with EPU 600 to provide a data path to/from an exception unit. Although in theory each SEE could connect separately with each of these devices, in practice the device is simplified and suffers little performance penalty by pairing certain SEEs with certain other functions.

Exception processing unit 600 can be a standard von Neumann central processing unit (CPU), although in many applications it can be a very rudimentary one. When included, EPU 600 is preferably used to handle complex code that either runs infrequently or is not timing-critical. Examples are a user log-on procedure, a request to make a local drive available remotely, error logging and recovery, table loading at system startup, and system configuration. EPU 600 responds to DXP requests indirectly, through s-code segments loaded into SEE 300-2. Preferably, EPU 600 can also call upon SEE 300-2 to perform functions for it, such as reading or writing to AMCD 700 or VMCD 800.

An e-code table 610 is preferably available to EPU 600. The e-code table contains boot instructions for the device, and may contain executable instructions for performing other functions requested by the DXP. Optionally, e-code table 610 may contain a table for translating s-code requests into instruction addresses for code to be executed, with the instruction addresses located in a conventional external memory space.

AN EXAMPLE

In order to better illustrate operation of RSP 500, an example for an implementation of the Address Resolution Protocol (ARP), as described in IETF RFC 826, is presented. This example walks through the creation of production rules, parser table entries, and the functional substance of s-code for handling received ARP packets.

Figure 10:
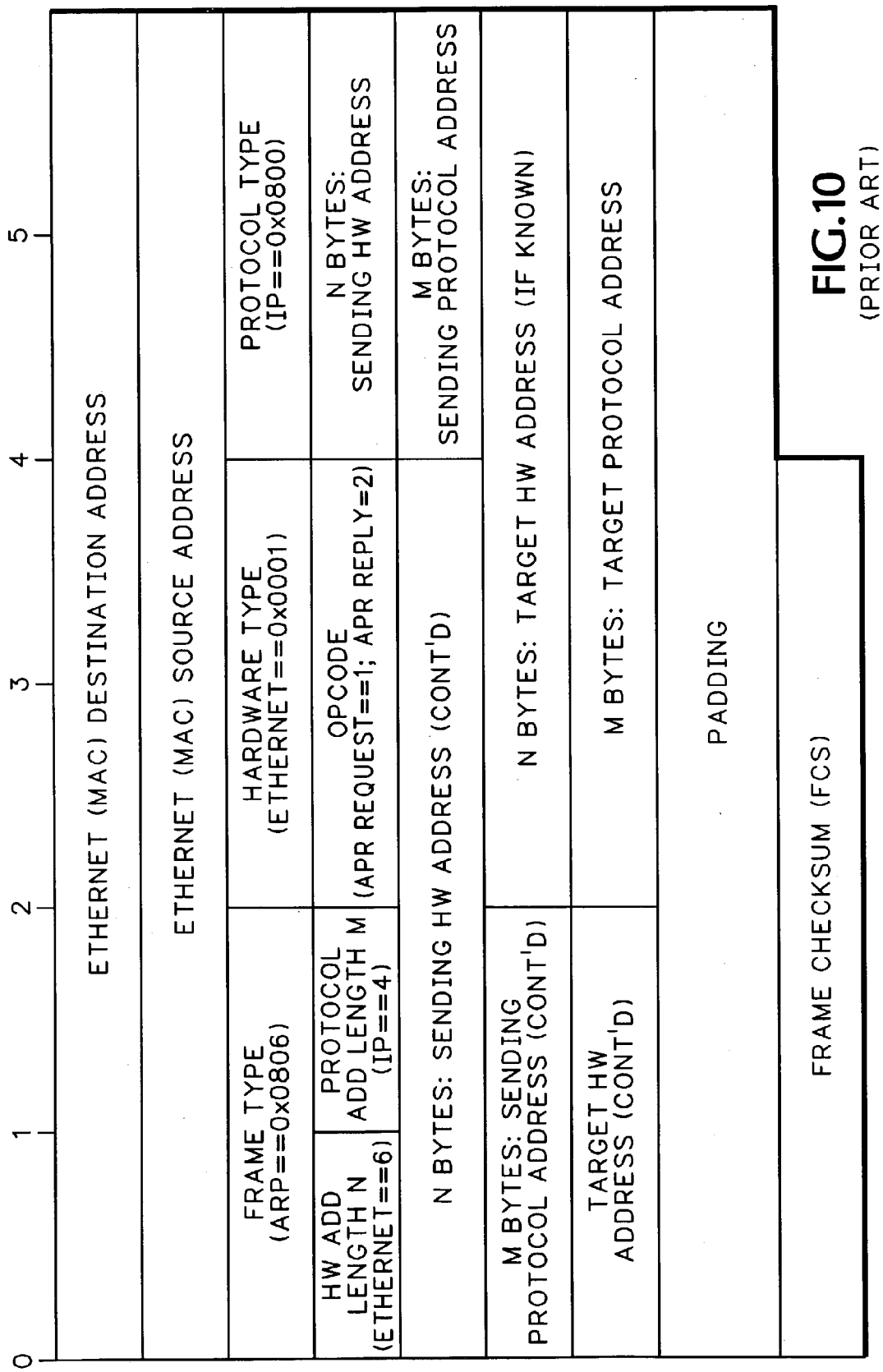
FIG. 10 shows the format of an Address Resolution Protocol packet.

Briefly, ARP packets allow local network nodes to associate each peer's link-layer (hardware) address with a network (protocol) address for one or more network protocols. This example assumes that the hardware protocol is Ethernet, and that the network protocol is Internet Protocol (IP or IPv4). Accordingly, ARP packets have the format shown in FIG. 10. When the opcode field is set to 1, the sender is trying to discover the target hardware address associated with the target protocol address, and is requesting an ARP reply packet. When the opcode field is set to 2, the sender is replying to an ARP request—in this case, the sender's hardware address is the target hardware address that the original sender was looking for.

The following exemplary grammar describes one way in which RSP 500 can process ARP packets received at the input port. A $ indicates the beginning of a production rule, { } enclose s-code to be performed by a SEE:

```
$MAC_PDU              := MAC_DA MAC_SA MAC_PAYLOAD MAC_FCS EoFrame
$MAC_DA               := 0X08 0X01 0X02 0X03 0X04 0X05
                       | 0XFF 0XFF 0XFF 0XFF 0XFF 0XFF
$MAC_SA               := etherAddType {s0: mct->curr_SA = MAC_SA}
$MAC_PAYLOAD          := 0X08 ET2
$ET2                  := 0X06 ARP_BODY | 0X00 IP_BODY
$ARP_BODY             := ARP_HW_TYPE ARP_PROT_TYPE ARP_HW_ADD_LEN
                         ARP_PROT_ADD_LEN ARP_OP ARP_PADDING
$ARP_HW_TYPE          := 0X0001
$ARP_PROT_TYPE        := 0x0800
$ARP_HW_ADD_LEN       := 0X06
$ARP_PROT_ADD_LEN     := 0X04 0x00
$ARP_OP               := 0x01 ARP_REQ_ADDR
                       | 0x02 ARP_REPLY_ADDR
$ARP_REQ_ADDR         := ARP_SENDER_HW ARP_SENDER_PROT ARP_TARGET_HW
                         ARP_TARGET_PROT {s1: s-code seg1}
$ARP_REPLY_ADDR       := ARP_SENDER_HW ARP_SENDER_PROT ARP_TARGET_HW
                         ARP_TARGET_PROT {s2: s-code seg2}
$ARP_SENDER_HW        := etherAddType
$ARP_SENDER_PROT      := ipAddType
$ARP_TARGET_HW        := etherAddType
$ARP_TARGET_PROT      := ipAddType
$ARP_PADDING          := octet | null {s3: calc. length; throw away}
$IP_BODY              := //unresolved by this example
$MAC_FCS              := octet octet octet octet {s4: check FCS}
$etherAddType         := octet octet octet octet octet octet
$ipAddType            := octet octet octet octet
```

-continued

| | |
|---|---|
| {s-code seg1 | := if ARP_TARGET_PROT ==mct->myIPAddress then generate ARP reply to mct->curr_SA; s-code seg2} |
| (s-code seg2 | := update mct->ArpCache with ARP_SENDER_HW, ARP_SENDER_PROT, mct->time} |

This example only processes a limited set of all possible ARP packets, namely those properly indicating fields consistent with an Ethernet hardware type and an IP protocol type; all others will fail to parse and will be rejected. This grammar also leaves a hook for processing IP packets ($IP_BODY) and thus will not reject IP packets, but a corresponding IP grammar is not part of this example.

Stepping through the productions, $MAC_PDU merely defines the MAC frame format. Two destination MAC addresses are allowed by $MAC_DA: a specific hardware address (0x08 0x01 0x02 0x03 0x04 0x05) and a broadcast address of all 1's. All other MAC addresses are automatically rejected, as a packet without one of these two addresses will fail to parse. Any source address is accepted by $MAC_SA; a SEE is called to save the source address to a master context table variable mct->curr_SA on the VMCD. $MAC_PAYLOAD and $ET2 combine to ensure that only two types of payloads are parsed, an ARP payload and an IP payload (further parsing of an IP payload is not illustrated herein). Of course, other packet types can be added by expanding these productions.

When the first two bytes of the MAC_PAYLOAD indicate an ARP packet (type=0x0806), the parser next tries to parse $ARP_BODY. For simplicity, the first four elements of the ARP body (hardware and protocol types and address lengths) are shown fixed—if ARP were implemented for another protocol as well as IP, these elements could be generalized (note that the generalization of the length fields might allow different sizes for the address fields that follow, a condition that would have to be accounted for in the production rules).

Two values for $ARP_OP are possible, a 1 for a request and a 2 for a reply. Although address parsing does not differ for the two values of ARP_OP, the s-code to be executed in each case does. S-code segment 1, which is executed for ARP requests, compares the target protocol to the local IP address stored in the master context table on the VMCD. When these are equal, a SEE generates an ARP reply packet to the sender's hardware and IP addresses. S-code segment 2 executes for both ARP requests and ARP replies—this segment updates an ArpCache array stored in the AMCD with the sender's hardware and protocol addresses and the time received. The "update" command to mct->ArpCache includes a flag or mask to identify which data in ArpCache should be used to perform the update; normally, the cache would be indexed at least by IP address.

In an Ethernet/IP ARP packet, ARP_PADDING will be 18 octets in length. The ARP_PADDING production rule shown here, however, fits any number of octets. In this example, an s-code segment is called to calculate the padding length and "throw away" that many octets, e.g., by advancing the input pointer. Alternately, the parser could use a five-octet look-ahead to the EoFrame token in the input; when the token is found, the preceding four octets are the FCS. An alternate embodiment where the parser has a variable symbol look-ahead capability will be explained at the conclusion of this example.

The MAC_FCS production indicates that a SEE is to check the FCS attached to the packet. A SEE may actually compute the checksum, or the checksum may be computed by input buffer or other hardware, in which case the SEE would just compare the packet value to the calculated value and reject the packet if no match occurs.

To further illustrate how the RSP 500 is configured to execute the ARP grammar above, exemplary production rule table and parser table values will now be given and explained. First, production rules will be shown, wherein hexadecimal notation illustrates a terminal value, decimal notation indicates a production rule, and "octet" will match any octet found at the head of an input stream. A non-terminal (NT) code is used as an index to the parser table; a production rule (PR) code is stored in the parser table, and indicates which production rule applies to a given combination of NT code and input value.

ARP Production Rules

| NT Code | Name | Prod. Rule No. | Prod. Rule Code | RHS Non-terminal Values | | | | | |
|---|---|---|---|---|---|---|---|---|---|
| 129 | MAC_PDU | 129.1 | 51 | 130 | 131 | 134 | 148 | 127 | |
| 130 | MAC_DA | 130.1 | 52 | 0x08 | 0x01 | 0x02 | 0x03 | 0x04 | 0x05 |
| | | 130.2 | 53 | 0xFF | 0xFF | 0xFF | 0xFF | 0xFF | 0xFF |
| 131 | MAC_SA | 131.1 | 54 | 132 | | | | | |
| 132 | EtherAddType | 132.1 | 55 | octet | octet | octet | octet | octet | octet |
| 133 | IpAddType | 133.1 | 56 | octet | octet | octet | octet | | |
| 134 | MAC_PAYLOAD | 134.1 | 57 | 0x08 | 135 | | | | |
| 135 | ET2 | 135.1 | 58 | 0x06 | 136 | | | | |
| | | 135.2 | 59 | 0x00 | $IP_BODY (unresolved) | | | | |
| 136 | ARP_BODY | 136.1 | 60 | 137 | 138 | 139 | 140 | 141 | 148 |
| 137 | ARP_HW_TYPE | 137.1 | 61 | 0x00 | 0x01 | | | | |
| 138 | ARP_PROT_TYPE | 138.1 | 62 | 0x08 | 0x00 | | | | |
| 139 | ARP_HW_ADD_LEN | 139.1 | 63 | 0x06 | | | | | |
| 140 | ARP_PROT_ADD_LEN | 140.1 | 64 | 0x04 | 0x00 | | | | |
| 141 | ARP_OP | 141.1 | 65 | 0x01 | 142 | | | | |
| | | 141.2 | 66 | 0x02 | 143 | | | | |

ARP Production Rules

| NT Code | Name | Prod. Rule No. | Prod. Rule Code | RHS Non-terminal Values | | | |
|---|---|---|---|---|---|---|---|
| 142 | ARP_REQ_ADDR | 142.1 | 67 | 144 | 145 | 146 | 147 |
| 143 | ARP_REPLY_ADDR | 143.1 | 68 | 144 | 145 | 146 | 147 |
| 144 | ARP_SENDER_HW | 144.1 | 69 | 132 | | | |
| 145 | ARP_SENDER_PROT | 145.1 | 70 | 133 | | | |
| 146 | ARP_TARGET_HW | 146.1 | 71 | 132 | | | |
| 147 | ARP_TARGET_PROT | 147.1 | 72 | 133 | | | |
| 148 | ARP_PADDING | 148.1 | 73 | octet | 148 | | |
| | | 148.2 | 74 | null | | | |
| 149 | MAC_FCS | 149.1 | 75 | octet | octet | octet | octet |

In the ARP production rule table above, the RHS Non-terminal Values, e.g., with a special end-of-rule symbol attached, are what get stored in the RSP's production rule table. The production rule codes are "pointers" to the corresponding production rules; it is the PR codes that actually get stored in the parser table. The following parser table segment illustrates the relationship between PR and PR code:

values (a blank value in a cell represents an invalid entry). This information can be coded in a matrix format, with each cell filled in, or can be coded in some other more economical format.

Given the tables above, an example of RSP execution for an Ethernet/ARP packet is now presented. In this example, the DXP is stepped by parser cycles, corresponding to one "loop" through the flowchart in FIG. 7. At each cycle, the

ARP Parser Table Values

| | Non-Terminal | Head of Input Stream Data Value | | | | | | | All others in |
|---|---|---|---|---|---|---|---|---|---|
| NT Code | Name | 0x00 | 0x01 | 0x02 | 0x04 | 0x06 | 0x08 | 0xFF | range [0x00–0xFF] |
| 0 | S (start symbol) | | | | | | | | |
| 127 | EoFrame | | | | | | | | |
| 128 | $ (bottom of stack) | | | | | | | | |
| 129 | MAC_PDU | | | | | | 51 | 51 | |
| 130 | MAC_DA | | | | | | 52 | | 53 |
| 131 | MAC_SA | | | | | 54 | | | |
| 132 | EtherAddType | | | | | 55 | | | |
| 133 | IpAddType | | | | | 56 | | | |
| 134 | MAC_PAYLOAD | | | | | | 57 | | |
| 135 | ET2 | 59 | | | | 58 | | | |
| 136 | ARP_BODY | 60 | | | | | | | |
| 137 | ARP_HW_TYPE | 61 | | | | | | | |
| 138 | ARP_PROT_TYPE | | | | | | 62 | | |
| 139 | ARP_HW_ADD_LEN | | | | | 63 | | | |
| 140 | ARP_PROT_ADD_LEN | | | | 64 | | | | |
| 141 | ARP_OP | | 65 | 66 | | | | | |
| 142 | ARP_REQ_ADDR | | | | | 67 | | | |
| 143 | ARP_REPLY_ADDR | | | | | 68 | | | |
| 144 | ARP_SENDER_HW | | | | | 69 | | | |
| 145 | ARP_SENDER_PROT | | | | | 70 | | | |
| 146 | ARP_TARGET_HW | | | | | 71 | | | |
| 147 | ARP_TARGET_PROT | | | | | 72 | | | |
| 148 | ARP_PADDING | | | | | 73*, 74 | | | |
| 149 | MAC_FCS | | | | | 75 | | | |

*PR 148.1/.2 is implemented using look-ahead capability in either the parser or a SEE The combination of an NT code and a "Head of Input Stream Data Value" index the parser table values in the RSP. Note that the start symbol S, EoFrame symbol, and bottom of stack symbol $ are special cases—the parser control FSM can be implemented to not reference the parser table for these symbols. For many NT codes, the table produces the same PR code regardless of the data value occupying the head of the input stream. In this example, all other NT codes have valid values for only one or two head of input stream following machine states are tracked: the input pointer ip, indicating the byte address of the current stream input symbol being parsed; the input symbol pointed to by the input pointer, *ip; the parser stack pointer psp, indicating which stack value is pointed to at the beginning of the parser cycle; the top-of-parser-stack symbol at the beginning of that parser cycle, *psp, where non-terminal symbols are indicated by the prefix "nt.", and the terminal symbol t.xx matches any input symbol; PT[*ip, *psp], the currently indexed value of the parser table; PRT[PT], the production rule pointed to by PT[*ip, *psp]; SCT[PT], the s-code segment pointed to by PT[*ip, *psp]; and *ps, the entire contents of the parser stack.

The following ARP packet will be used in the example, where all values are stated in hexadecimal notation:

```
0x0000:  FF FF FF FF FF FF 00 02 3F 77 6D 9E 08 06 00 01
0x0010:  08 00 06 04 00 01 00 02 3F 77 6D 9E C0 A8 00 04
0x0020:  00 00 00 00 00 00 C0 A8 00 06 3A 20 33 0D 0A 53
0x0030:  54 3A 20 75 72 6E 3A 73 63 68 65 6D EF 73 84 CC
```

This is an ARP request packet sent to a broadcast MAC address, requesting the hardware address associated with a network address 192.168.0.6, which in this example is a network address assigned to the RSP. The results for parsing this example packet are shown below in tabular format, followed by a brief explanation. Although the example is lengthy, it in instructive as it exercises most of the basic functions of the RSP.

ARP Packet Parser Cycle Example

| Parser Cycle | ip | a = *ip | psp | X = *psp | y = PT [a, X] | PRT[y] | SCT[y] | *ps |
|---|---|---|---|---|---|---|---|---|
| 0 | 0x00 | 0xFF | 1 | nt.129 | 51 | nt.130 nt.131 nt.134 nt.149 nt.127 | NULL | nt.129 nt.128 |
| 1 | 0x00 | 0xFF | 5 | nt.130 | 53 | 0xFF 0xFF 0xFF 0xFF 0xFF 0xFF | NULL | nt.130 nt.131 nt.134 nt.149 nt.127 nt.128 |
| 2 | 0x00 | 0xFF | 10 | 0xFF | N/A | N/A | N/A | 0xFF 0xFF 0xFF 0xFF 0xFF 0xFF nt.131 nt.134 nt.149 nt.127 nt.128 |
| 3 | 0x01 | 0xFF | 9 | 0xFF | N/A | N/A | N/A | 0xFF 0xFF 0xFF 0xFF 0xFF nt.131 nt.134 nt.149 nt.127 nt.128 |
| 4 | 0x02 | 0xFF | 8 | 0xFF | N/A | N/A | N/A | 0xFF 0xFF 0xFF 0xFF nt.131 nt.134 nt.149 nt.127 nt.128 |
| 5 | 0x03 | 0xFF | 7 | 0xFF | N/A | N/A | N/A | 0xFF 0xFF 0xFF nt.131 nt.134 nt.149 nt.127 nt.128 |
| 6 | 0x04 | 0xFF | 6 | 0xFF | N/A | N/A | N/A | 0xFF 0xFF nt.131 nt.134 nt.149 nt.127 nt.128 |
| 7 | 0x05 | 0xFF | 5 | 0xFF | N/A | N/A | N/A | 0xFF nt.131 nt.134 nt.149 nt.127 nt.128 |
| 8 | 0x06 | 0x00 | 4 | nt.131 | 54 | t.xx t.xx t.xx t.xx t.xx t.xx | s0 | nt.131 nt.134 nt.149 nt.127 nt.128 |
| 9 | 0x06 | 0x00 | 9 | t.xx | N/A | N/A | N/A | t.xx t.xx t.xx t.xx t.xx nt.134 nt.149 nt.127 nt.128 |
| 10 | 0x07 | 0x02 | 8 | t.xx | N/A | N/A | N/A | t.xx t.xx t.xx t.xx t.xx nt.134 nt.149 nt.128 nt.128 |
| 11 | 0x08 | 0x3F | 7 | t.xx | N/A | N/A | N/A | t.xx t.xx t.xx t.xx nt.134 nt.149 nt.127 nt.128 |
| 12 | 0x09 | 0x77 | 6 | t.xx | N/A | N/A | N/A | t.xx t.xx t.xx nt.134 nt.149 nt.127 nt.128 |
| 13 | 0x0A | 0x6D | 5 | t.xx | N/A | N/A | N/A | t.xx t.xx nt.134 nt.149 nt.127 nt.128 |
| 14 | 0x0B | 0x9E | 4 | t.xx | N/A | N/A | N/A | t.xx nt.134 nt.149 nt.127 nt.128 |
| 15 | 0x0C | 0x08 | 3 | nt.134 | 57 | 0x08 nt.135 | NULL | nt.134 nt.149 nt.127 nt.128 |
| 16 | 0x0C | 0x08 | 4 | 0x08 | N/A | N/A | N/A | 0x08 nt.135 nt.149 nt.127 nt.128 |

-continued

ARP Packet Parser Cycle Example

| Parser Cycle | ip | a = *ip | psp | X = *psp | y = PT [a, X] | PRT[y] | SCT[y] | *ps |
|---|---|---|---|---|---|---|---|---|
| 17 | 0x0D | 0x06 | 3 | nt.135 | 58 | 0x06 nt.136 | NULL | nt.135 nt.149 nt.127 nt.128 |
| 18 | 0x0D | 0x06 | 4 | 0x06 | N/A | N/A | N/A | 0x06 nt.136 nt.149 nt.127 nt.128 |
| 19 | 0x0E | 0x00 | 3 | nt.136 | 60 | nt.137 nt.138 nt.139 nt.140 nt.141 nt.148 | NULL | nt.136 nt.149 nt.127 nt.128 |
| 20 | 0x0E | 0x00 | 8 | nt.137 | 61 | 0x00 0x01 | NULL | nt.137 nt.138 nt.139 nt.140 nt.141 nt.148 nt.149 nt.127 nt.128 |
| 21 | 0x0E | 0x00 | 9 | 0x00 | N/A | N/A | N/A | 0x00 0x01 nt.138 nt.139 nt.140 nt.141 nt.148 nt.149 nt.127 nt.128 |
| 22 | 0x0F | 0x01 | 8 | 0x01 | N/A | N/A | N/A | 0x01 nt.138 nt.139 nt.140 nt.141 nt.148 nt.149 nt.127 nt.128 |
| 23 | 0x10 | 0x08 | 7 | nt.138 | 62 | 0x08 0x00 | NULL | nt.138 nt.139 nt.140 nt.141 nt.148 nt.149 nt.127 nt.128 |
| 24 | 0x10 | 0x08 | 8 | 0x08 | N/A | N/A | N/A | 0x08 0x00 nt.139 nt.140 nt.141 nt.148 nt.149 nt.127 nt.128 |
| 25 | 0x11 | 0x00 | 7 | 0x00 | N/A | N/A | N/A | 0x00 nt.139 nt.140 nt.141 nt.148 nt.149 nt.127 nt.128 |
| 26 | 0x12 | 0x06 | 6 | nt.139 | 63 | 0x06 | N/A | nt.139 nt.140 nt.141 nt.148 nt.149 nt.127 nt.128 |
| 27 | 0x12 | 0x06 | 6 | 0x06 | N/A | N/A | N/A | 0x06 nt.140 nt.141 nt.148 nt.149 nt.127 nt.128 |
| 28 | 0x13 | 0x04 | 5 | nt.140 | 64 | 0x04 0x00 | N/A | nt.140 nt.141 nt.148 nt.149 nt.127 nt.128 |
| 29 | 0x13 | 0x04 | 6 | 0x04 | N/A | N/A | N/A | 0x04 0x00 nt.141 nt.148 nt.149 nt.127 nt.128 |
| 30 | 0x14 | 0x00 | 5 | 0x00 | N/A | N/A | N/A | 0x00 nt.141 nt.148 nt.149 nt.127 nt.128 |
| 31 | 0x15 | 0x01 | 4 | nt.141 | 65 | 0x01 nt.142 | NULL | nt.141 nt.148 nt.149 nt.127 nt.128 |
| 32 | 0x15 | 0x01 | 5 | 0x01 | N/A | N/A | N/A | 0x01 nt.142 nt.148 nt.149 nt.127 nt.128 |
| 33 | 0x16 | 0x00 | 4 | nt.142 | 67 | nt.144 nt.145 nt.146 nt.147 | s1 | nt.142 nt.148 nt.149 nt.127 nt.128 |
| 34–61 | Cycle Sender and Target Hardware and Protocol Addresses Through Parser, SEE is executing code to match target protocol address and send ARP reply if match | | | | | | | |
| 62 | 0x2A | 0x3A | 3 | nt.148 | 73/74 | null | s3 | nt.148 nt.149 nt.127 nt.128 |
| 63 | 0x2A | 0x3A | 3 | null | N/A | N/A | N/A | null nt.149 nt.127 nt.128 |
| 64 | 0x3C | 0xEF | 2 | nt.149 | 75 | t.xx t.xx t.xx t.xx | s4 | nt.149 nt.127 nt.128 |
| 65 | 0x3C | 0xEF | 5 | t.xx | N/A | N/A | N/A | t.xx t.xx t.xx t.xx nt.127 nt.128 |
| 66 | 0x3D | 0x73 | 4 | t.xx | N/A | N/A | N/A | t.xx t.xx t.xx nt.127 nt.128 |
| 67 | 0x3E | 0x84 | 3 | t.xx | N/A | N/A | N/A | t.xx t.xx nt.127 nt.128 |
| 68 | 0x3F | 0xCC | 2 | t.xx | N/A | N/A | N/A | t.xx nt.127 nt.128 |
| 69 | 0x40 | EoF | 1 | nt.127 | frame end processing | | | nt.127 nt.128 |
| 70 | 0x41 | ? | 0 | nt.128 | waiting for start of new frame | | | nt.128 |

Generally, the detailed example above illustrates how production rules are expanded onto the parser stack and then processed individually, either by: matching a terminal symbol with an input symbol (see, e.g., parser cycles 2–7); matching a terminal don't care symbol t.xx with an input symbol (see, e.g., parser cycles 9–14); further expanding a non-terminal symbol either irrespective of input (see, e.g., parser cycle 8) or based on the current input symbol (see, e.g., parser cycles 0, 1, 17); or executing a null cycle, in this case to allow a SEE to adjust the input pointer to "skip" parsing for a padding field (parser cycle 63). This example also illustrates the calls to s-code segments at appropriate points during the parsing process, depending on which production rules get loaded onto the stack (parser cycles 8, 33, 62, 64). It can be appreciated that some of these code segments can execute in parallel with continued parsing.

The exemplary grammar given above is merely one way of implementing an ARP grammar according to an embodiment of the invention. Some cycle inefficiencies could be reduced by explicitly expanding some of the non-terminals into their parent production rules, for example. The ARP grammar could also be generalized considerably to handle more possibilities. The coding selected, however, is meant to illustrate basic principles and not all possible optimizations or ARP features. Explicit expansions may also be limited by the chosen stack size for a given implementation.

In an alternate embodiment, DXP 200 can implement an LL(f(X)) parser, where the look-ahead value f(X) is coded in a stack symbol, such that each stack symbol can specify its own look-ahead. As an example, the production rule for ARP$_{13}$ PADDING in the previous example could be specified as $ARP_PADDING :=octet ARP_PADDING | EoFrame, (LA5)

where (LA5) indicates an input symbol look-ahead of 5 symbols for this rule. The look-ahead value is coded into the production rule table, such that when the rule is executed DXP 200 looks up (X a+5) in the production rule table.

A variable look-ahead capability can also be used to indicate that multiple input symbols are to be used in a table lookup. For instance, the production rule for MAC_DA could be specified as

```
$MAC_DA :=    0x08 0x01 0x02 0x03 0x04 0x05

|    0xFF 0xFF 0xFF 0xFF 0xFF 0xFF,   (LA6)
```

Instead of creating two production rules 52 and 53 with six terminal symbols each, the parser table contains two entries that match six symbols each, e.g., at parser table locations (X, a)=(130, 0x08 0x01 0x02 0x03 0x04 0x05) and (130, 0XFF 0xFF 0xFF 0xFF 0xFF 0xFF).

With such an approach, a standard row, column matrix parser table could prove very wasteful due to the number of addressable columns needed for up to a six-octet input symbol width, and the sparsity of such a matrix. One alternate implementation, using a ternary CAM, is shown in FIG. 11.

Ternary CAM 900 of FIG. 11 is loaded with a table of match addresses and corresponding production rule codes. Each match address comprises a one-octet stack symbol X and six octets of input symbols a1, a2, a3, a4, a5, a6. When a match address is supplied to CAM 900, it determines whether a match exists in its parser table entries. If a match exists, the corresponding production rule code is returned (alternately, the address of the table entry that caused a match is returned, which can be used as an index into a separate table of production rule codes or pointers).

One advantage of the parser table implementation of FIG. 11 is that it is more efficient than a matrix approach, as entries are only created for valid combinations of stack and input symbols. This same efficiency allows for longer input symbols strings to be parsed in one parser cycle (up to six input symbols are shown, but a designer could use whatever length is convenient), thus a MAC or IP address can be parsed in one parser cycle. Further, look-ahead capability can be implicitly coded into the CAM, e.g., the next six input symbols can always be supplied to the table. For production rules corresponding to LL(1) parsing (such as the row for X=136 in CAM 900), the CAM bits corresponding to a2, a3, a4, a5, a6 on that row are set to a "don't care" value xx, and merely do not contribute to the lookup. For production rules corresponding to LL(2) parsing (such as the rows for X=134 and 135, which match a two-octet packet type field for ARP and IP packets, respectively), the CAM bits corresponding to a3, a4, a5, a6 on those rows are set to xx. Up to LL(6) parsing can be entered in the table, as is shown in the two MAC address entries for X=129. Note that if a1, a2, a3, a4, a5 were set to xx, a true six-symbol look-ahead can also be implemented. One last observation is that with a ternary CAM, each bit can be set independently to a "don't care" state, thus production rules can also be set to ignore certain bits, e.g., in a flag field.

A binary CAM can also function in a parser table implementation. The primary difference is that the binary CAM cannot store "don't care" information explicitly, thus leaving the parser state machine (or some other mechanism) responsible for handling any "don't care" functionality in some other manner.

One of ordinary skill in the art will recognize that the concepts taught herein can be tailored to a particular application in many other advantageous ways. For instance, many variations on the codes and addressing schemes presented are possible. In the described embodiments, a microinstruction code segment ends with a NULL instruction—the occurrence of the NULL instruction can be detected either by the S-bus interface of a SEE, by the microinstruction decoder, or even by an s-code table function. The s-code addresses do not necessarily have to be known to the SEEs; it is possible for the SCT to track instruction pointers for each SEE, with the instruction pointers for each SEE set by the DXP. Although multiple memory storage areas with different interfaces are illustrated, several of the interfaces can share access to a common memory storage area that serves as a physical storage space for both. Those skilled in the art will recognize that some components, such as the exception processing unit, can either by integrated with the RSP or connect to the RSP as a separate unit.

It is not critical how the parser table, production rule table, and s-code table are populated for a given set of grammars—the population can be achieved, for example, through an EPU, a boot-code segment on one of the SEEs, or a boot-grammar segment with the table population instructions provided at the input port. The tables can also, of course, be implemented with non-volatile memory so that table reloading is not required at every power-up.

The flowchart illustrating the operation of the DXP is merely illustrative—for instance, it is recognized herein that a given state machine implementation may accomplish many tasks in parallel that are shown here as sequential tasks, and may perform many operations speculatively.

Although several embodiments have been shown and described with a single input port, the description of "an" input port merely acknowledges that at least one port exists. The physical port arrangement can be varied depending on application. For instance, depending on port bandwidth and parser performance, several input ports may be multiplexed to the same direct execution parser.

Those skilled in the art recognize that other functional partitions are possible within the scope of the invention. Further, what functions are and are not implemented on a common integrated circuit (for a hardware implementation) is a design choice, and can vary depending on application. It is also recognized that the described parser functions can be implemented on a general-purpose processor, using conventional software techniques, although this may defeat some of the advantages present with the hardware embodiments.

Finally, although the specification may refer to "an", "one", "another", or "some" embodiment(s) in several locations, this does not necessarily mean that each such reference is to the same embodiment(s), or that the feature only applies to a single embodiment.

What is claimed is:

1. A data processing system comprising:
   an input port to receive data symbols;
   a direct execution parser having a stack to store stack symbols, the parser capable of processing stack symbols in response to the received data symbols;
   a parser table accessible by the parser, the parser table capable of population with production rule codes indexable by the combination of at least one received data symbol and a stack symbol supplied by the parser;
   a production rule table accessible by the parser, the production rule table capable of population with production rules indexable by production rule codes;
   a first semantic code execution engine capable of executing machine instructions when prompted by the direct execution parser, using machine instruction segments indicated by the parser; and
   a semantic code table accessible by the semantic code execution engine, the semantic code table capable of population with machine instruction segments indexable by production rule codes.

2. The system of claim 1, further comprising a second semantic code execution engine capable of executing machine instructions when prompted by the direct execution parser, using machine instructions indicated by the parser, the first and second semantic code execution engines capable of parallel machine instruction execution.

3. The system of claim 2, further comprising an exception processing unit having a microprocessor and associated memory, the exception processing unit capable of performing tasks at the request of at least one of the semantic code execution engines.

4. The system of claim 2, further comprising a block input/output port connected to at least one of the semantic code execution engines, the block input/output port capable of initiating block input/output operations under control of the at least one semantic code execution engine.

5. The system of claim 2, wherein a production rule code allows the direct execution parser to determine whether a corresponding segment of semantic code table machine instructions can be directed to any available semantic code execution engine, or whether that segment should be directed to a specific semantic code execution engine.

6. The system of claim 1, further comprising an interface between the direct execution parser and the semantic code execution engine, the interface having the capability to suspend stack symbol processing by the direct execution parser when directed by the semantic code execution engine.

7. The system of claim 1, wherein the parser table, production rule table, and semantic code table at least partially reside in reprogrammable storage.

8. The system of claim 7, wherein the system processes data packets, each data packet formatted according to one or more network protocols, the parser table, production rule table, and semantic code table reprogrammable to support parsing for different network protocols.

9. The system of claim 8, wherein the system can load parser table reprogrammable storage with a network protocol while the system is processing data packets.

10. The system of claim 1, further comprising a machine context data interface connected to a data storage area and accessible by the semantic code execution engine, the machine context data interface managing the data storage area and performing data operations in response to machine context instructions issued by the semantic code execution engine.

11. The system of claim 10, the machine context data interface comprising a variable machine context data interface and an array machine context data interface, the array machine context data interface capable of managing and performing data operations on array data.

12. The system of claim 11, wherein the array machine context data interface accesses at least one data storage area with a data access format different from that of the data storage area accessed by the variable machine context data interface.

13. The system of claim 1, wherein at least the direct execution parser, the parser table, and the production rule table are implemented using software to configure a microprocessor and its attached memory.

14. The system of claim 1, wherein the production rule table is capable of storing bitmasked terminal symbols, each bitmasked terminal symbol capable of indicating that selected bits in a corresponding input symbol are "don't care" bits.

15. The system of claim 1, wherein the direct execution parser performs a parsing method selected from the group of methods including LL parsing, LR parsing, LALR parsing, and recursive descent parsing.

16. The system of claim 1, wherein the direct execution parser is capable of parsing input symbols using a variable input symbol look-ahead that can be varied for each stack symbol.

17. The system of claim 16, wherein the variable input symbol look-ahead can be stored as a value in the production rule table along with the production rules, and wherein the direct execution parser loads the variable input symbol look-ahead when it loads a production rule into the stack.

18. The system of claim 16, wherein the parser table comprises a binary or ternary content-addressable memory (CAM) with a word size capable of storing entries corresponding to the combination of a stack symbol and up to N input symbols.

19. The system of claim 18, wherein the parser supplies N input symbols to the parser table on each access, each CAM entry determining which of the N input symbols affect the lookup for that CAM entry.

20. An integrated circuit comprising:
    an input port to receive data symbols;
    a direct execution parser having a stack to store stack symbols, the parser capable of processing stack symbols in response to the received data symbols;
    a parser table accessible by the parser, the parser table capable of population with production rule codes indexable by the combination of a received data symbol and a stack symbol supplied by the parser;
    a production rule table accessible by the parser, the production rule table capable of population with production rules indexable by production rule codes;
    a first semantic code execution engine capable of executing machine instructions when prompted by the direct execution parser, using machine instruction segments indicated by the parser; and
    a semantic code table accessible by the semantic code execution engine, the semantic code table capable of population with machine instruction segments indexable by production rule codes.

21. The integrated circuit of claim 20, further comprising a second semantic code execution engine capable of executing machine instructions when prompted by the direct execution parser, using machine instructions indicated by the parser, the first and second semantic code execution engines capable of parallel machine instruction execution.

22. The integrated circuit of claim 21, further comprising an exception processing unit having a microprocessor, the exception processing unit capable of performing programmable tasks at the request of at least one of the semantic code execution engines.

23. The integrated circuit of claim 21, further comprising a block input/output port connected to at least one of the semantic code execution engines, the block input/output port capable of initiating block input/output operations under control of the at least one semantic code execution engine.

24. The integrated circuit of claim 21, wherein a production rule code allows the direct execution parser to determine whether a corresponding segment of semantic code table machine instructions can be directed to any available semantic code execution engine, or whether that segment should be directed to a specific semantic code execution engine.

25. The integrated circuit of claim 20, further comprising an interface between the direct execution parser and the semantic code execution engine, the interface having the capability to suspend stack symbol processing by the direct execution parser when directed by the semantic code execution engine.

26. The integrated circuit of claim 20, wherein the parser table, production rule table, and semantic code table at least partially reside in reprogrammable storage.

27. The integrated circuit of claim 26, wherein the parser table, production rule table, and semantic code table comprise caches for larger table residing in memory separate from the integrated circuit.

28. The integrated circuit of claim 20, further comprising a machine context data interface connectable to a data storage area and accessible by the semantic code execution engine, the machine context data interface managing the data storage area and performing data operations in response to machine context instructions issued by the semantic code execution engine.

29. The integrated circuit of claim 28, wherein the data storage area is at least partially integrated on the integrated circuit.

30. The integrated circuit of claim 28, the machine context data interface comprising a variable machine context data interface and an array machine context data interface, the array machine context data interface capable of managing and performing data operations on array data.

31. The integrated circuit of claim 30, wherein the array machine context data interface accesses at least one data storage area with a data access format different from that of the data storage area accessed by the variable machine context data interface.

32. An integrated circuit comprising:
an input port to receive data symbols;
a direct execution parser having a stack to store stack symbols, the parser capable of processing stack symbols in response to the received data symbols;
a parser table accessible by the parser, the parser table capable of population with production rule codes indexable by the combination of a received data symbol and a stack symbol supplied by the parser;
a production rule table accessible by the parser, the production rule table capable of population with production rules indexable by production rule codes;
multiple semantic code execution engines, each capable of executing machine instructions when prompted by the direct execution parser, using machine instruction segments indicated by the parser;
a semantic code table accessible by the semantic code execution engines, the semantic code table capable of population with machine instruction segments indexable by production rule codes; and
a machine context data interface connectable to a data storage area and accessible by the semantic code execution engines, the machine context data interface managing the data storage area and performing data operations in response to machine context instructions issued by the semantic code execution engines.

33. The integrated circuit of claim 32, further comprising:
a first bus between the semantic code execution engines and the semantic code table; and
a second bus between the semantic code execution engines and the machine context data interface.

34. The integrated circuit of claim 33, further comprising an input bus to allow the semantic code execution engines access to the data symbols.

35. The integrated circuit of claim 32, further comprising an interface between the direct execution parser and the semantic code execution engines, the interface having access to status information for each semantic code execution engine and having the capability to suspend stack symbol processing by the direct execution parser based on the status of a semantic code execution engine.

36. The integrated circuit of claim 35, wherein the status information comprises a set of semaphores corresponding to the semantic code execution engines and settable by the corresponding semantic code execution engines.

37. The integrated circuit of claim 36, further comprising at least a section of the parser table, production rule table, and semantic code table integrated on the circuit.

38. The integrated circuit of claim 36, wherein the production rule table is capable of storing bitmasked terminal symbols, each bitmasked terminal symbol capable of indicating that selected bits in a corresponding input symbol are "don't care" bits.

39. The integrated circuit of claim 36, wherein the direct execution parser performs a parsing method selected from the group of methods including LL parsing, LR parsing, LALR parsing, and recursive descent parsing.

40. The integrated circuit of claim 36, wherein the direct execution parser is capable of parsing input symbols using a variable input symbol look-ahead that can be varied for each stack symbol.

41. The integrated circuit of claim 40, wherein the variable input symbol look-ahead can be stored as a value in the production rule table along with the production rules, and wherein the direct execution parser loads the variable input symbol look-ahead when it loads a production rule into the stack.

42. The integrated circuit of claim 40, wherein the parser table comprises a ternary content-addressable memory (CAM) with a word size capable of storing entries corresponding to the combination of a stack symbol and up to N input symbols.

43. The integrated circuit of claim 42, wherein the parser supplies N input symbols to the parser table on each access, each CAM entry determining which of the N input symbols affect the lookup for that CAM entry.

44. A computer-readable storage medium containing computer instructions that, when executed by a processor, perform a method to configure a semantic parsing system to parse packets, the method comprising:

electrically generating a set of parseable grammatical production rules used by the semantic parsing system, each comprising at least one symbol selected from the group of terminal and non-terminal symbols, and a set of machine context tasks to be performed for at least some of the production rules by an execution engine;

electrically assigning a non-terminal code and a production rule code to each production rule used by the semantic parsing system;

electrically storing the grammatical production rules used by the semantic parsing system in a machine-storable format in a production rule memory, indexable by the semantic parsing system according to production rule codes;

electrically storing the machine context tasks in an execution-engine instruction code format in a semantic code memory, indexable by the semantic parsing system according to the production rule code associated with the corresponding production rule used by the semantic parsing system; and electrically generating a parser table of production rule codes used by the semantic parsing system in machine-storable format, indexable by the semantic parsing system according to the combination of a non-terminal symbol and at least one symbol appearing in a packet to be parsed by the semantic parsing system.

45. The computer-readable storage medium containing computer instructions that, when executed by the processor, perform the method of claim 44, the method further comprising electrically affixing a prefix code to the symbols in the machine-storable format production rules, the prefix code indicating whether each symbol is a terminal or non-terminal symbol.

46. The computer-readable storage medium containing computer instructions that, when executed by the processor, perform the method of claim 45, wherein the prefix code further indicating whether a terminal symbol can match any network packet protocol symbol that it is paired with.

47. The computer-readable storage medium containing computer instructions that, when executed by the processor, perform the method of claim 44, the method further comprising, for at least one terminal symbol, electrically assigning a bitmask to that symbol and storing the bitmask with the production rule containing that symbol.

48. The computer-readable storage medium containing computer instructions that, when executed by the processor, perform the method of claim 44, the method further comprising electrically setting at least some indices in the parser table based on the combination of a non-terminal symbol and multiple input symbols.

49. The computer-readable storage medium containing computer instructions that, when executed by the processor, perform the method of claim 48, wherein each index in the parser table can be based on up to N input symbols in N index positions, and wherein setting at least some indices in the parser table comprises, for each indice, using between 1 and N index positions and setting the remainder of the index positions, if any, to a "don't care" condition.

* * * * *